United States Patent [19]

Stewart

[11] Patent Number: 4,526,759
[45] Date of Patent: Jul. 2, 1985

[54] FLUIDIZED BED REACTOR UTILIZING IN-BED HEAT EXCHANGER TUBES WHICH REGISTER WITH WATER WALL TUBES

[75] Inventor: Robert D. Stewart, Verona, N.J.

[73] Assignee: Foster Wheeler Energy Corporation, Livingston, N.J.

[21] Appl. No.: 386,478

[22] Filed: Jun. 9, 1982

[51] Int. Cl.³ .............. F27B 15/00; F27B 15/16; B01J 8/24
[52] U.S. Cl. .............. 422/143; 165/104.16; 422/140; 422/146
[58] Field of Search .............. 422/140, 143, 145, 146; 165/104.16

[56] References Cited

U.S. PATENT DOCUMENTS

| | | | |
|---|---|---|---|
| 2,536,099 | 1/1951 | Schleicher | 422/143 X |
| 2,931,711 | 4/1960 | Walker | 422/146 |
| 3,589,342 | 6/1971 | Barker et al. | 165/104.16 X |
| 4,130,071 | 12/1978 | Porter | |
| 4,136,642 | 1/1979 | Novotny et al. | |
| 4,167,157 | 9/1979 | Zielinski et al. | |
| 4,351,275 | 9/1982 | Bhojwani et al. | 422/145 X |

Primary Examiner—Barry S. Richman
Assistant Examiner—William R. Johnson
Attorney, Agent, or Firm—Marvin A. Naigur; John E. Wilson; Warren B. Kice

[57] ABSTRACT

A fluidized bed reactor in which at least a portion of the walls of the reactor housing are formed by a plurality of water wall tubes. A fluidized bed is formed in the housing and a plurality of heat exchange tubes are provided, at least a portion of each of which extends into the bed. One or both ends of each heat exchange tube registers with a water wall tube and a water flow circuit is formed that includes the water wall tubes and heat exchange tubes for passing the water in a heat exchange relation with the bed.

4 Claims, 6 Drawing Figures

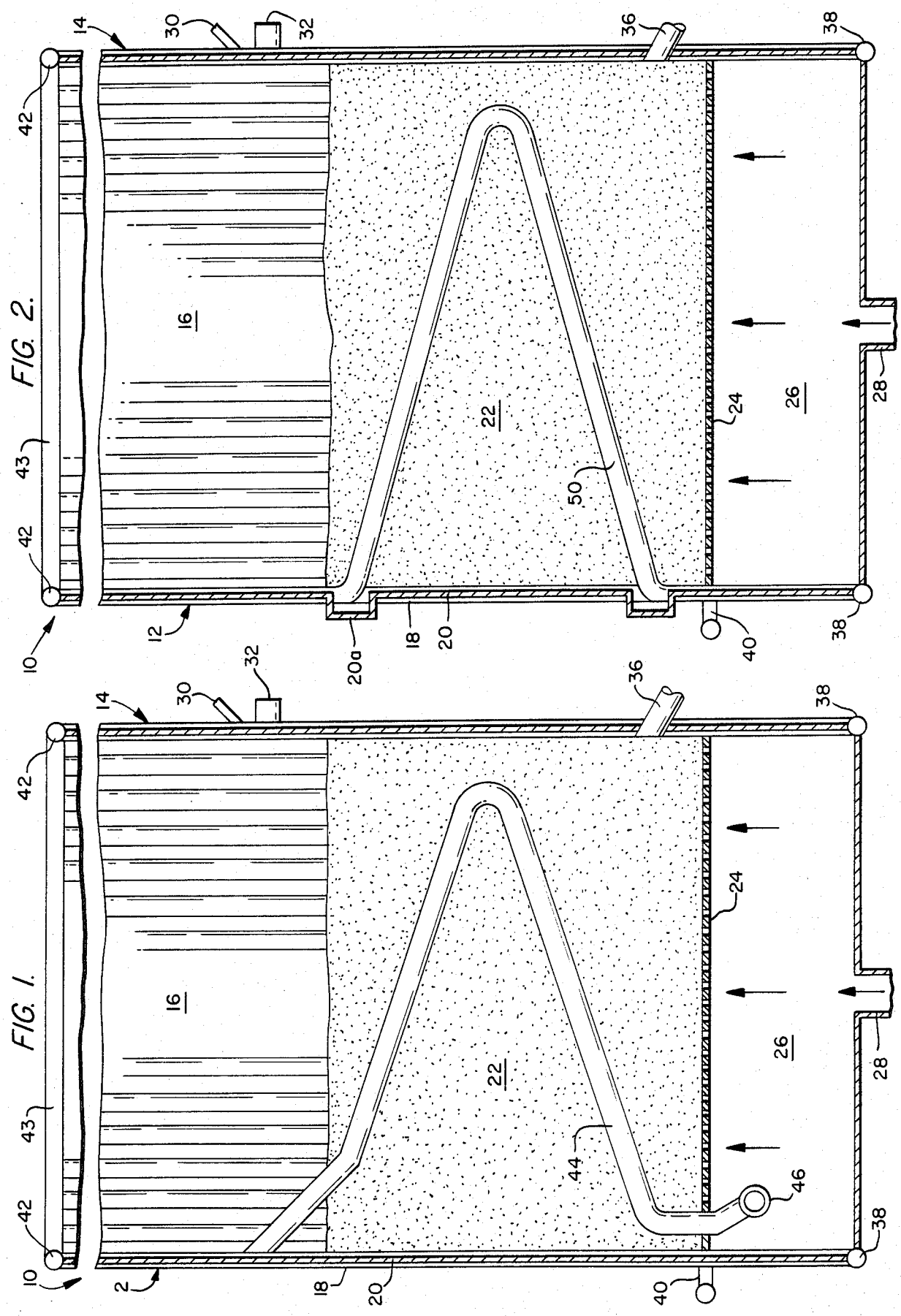

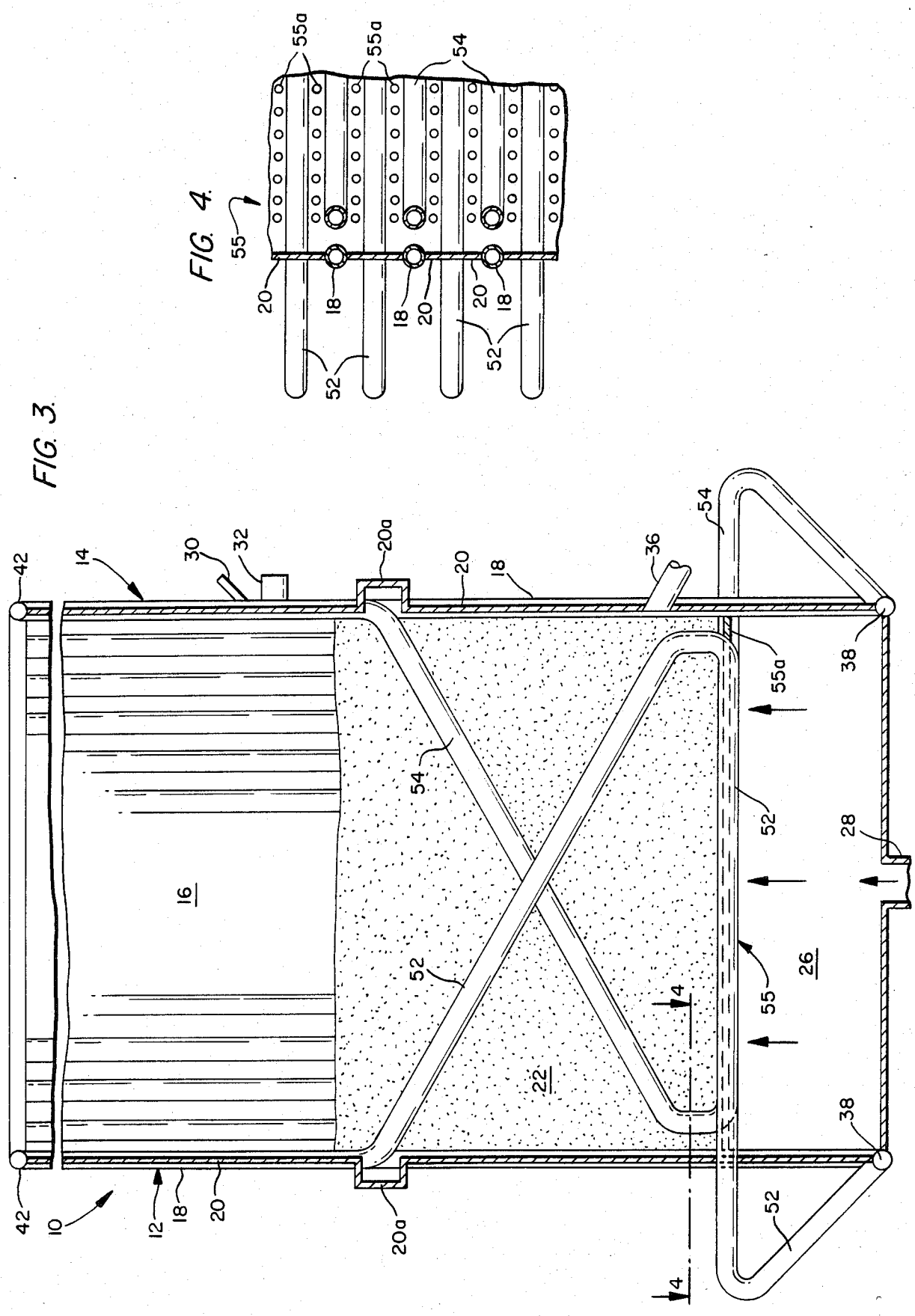

FLUIDIZED BED REACTOR UTILIZING IN-BED HEAT EXCHANGER TUBES WHICH REGISTER WITH WATER WALL TUBES

BACKGROUND OF THE INVENTION

This invention relates to a fluidized bed reactor and, more particularly, to such a reactor in which heat is generated by the combustion of particulate fuel in a fluidized bed.

Fluidized bed reactors, usually in the form of combustors, boilers, gasifiers, vaporizers, or steam generators, are well known. In a normal fluidized bed arrangement, air is passed through a perforated plate, or grate, which supports a bed of particulate material, usually including a mixture of fuel material, such as high sulfur bituminous coal, and an adsorbent material for the sulfur released as a result of the combustion of the coal. As a result of the air passing through the bed, the bed behaves like a boiling liquid which promotes the combustion of the fuel. In addition to enjoying a high capability for reducing the amount of sulfur in the combustion gases introduced to the atmosphere, such an arrangement permits relatively high heat transfer rates per unit size, substantially uniform bed temperatures, relatively low combustion temperatures and reduction in corrosion and boiler fouling.

In many applications of the fluidized bed process, and especially in connection with combustion and reaction processes, heat absorbing-steam generating enclosure walls are provided which are formed by a plurality of interconnected water tubes through which water is passed to pick up heat from the fluidized bed and convert the water to steam. In these cases, the fluidized bed must be designed to operate within close temperature limits requiring the installation of heat absorbing surfaces, usually in the form of additional coils, or tube bundles, installed in the bed, since considerably more heat must be removed from the bed than can be removed by the enclosure walls. It is conventional practice to provide separate individual feeders to, and risers, or the like, from each wall section and steam generating tube bundle circuit independently. However, the complexity and cost of this separate circuiting (with associated individual tubing, piping, headers, enclosure wall penetrations, drum penetrations, weldments, supports, insulation and lagging) can be significant, particularly where large differences in elevation exist between circuit inlets and the steam drum or circuit outlets.

SUMMARY OF THE INVENTION

It is therefore an object of the present invention to provide a fluidized bed reactor which incorporates heat absorption surfaces in the fluidized bed without the complexities and high costs normally associated therewith.

It is a further object of the present invention to provide a fluidized bed reactor of the above type in which additional water tube bundles are installed in the reactor in a simple and efficient manner at a minimum cost.

It is a further object of the present invention to provide a fluidized bed reactor of the above type in which the additional water tubes are joined to the existing water circuit provided in the reactor including the water tube walls forming the reactor housing.

Toward the fulfillment of these and other objects, the reactor of the present invention includes an enclosure at least a portion of the walls of which are formed by a plurality of water wall tubes. A fluidized bed is supported in the housing and a plurality of heat exchange tubes are provided, at least a portion of each of which extends into the bed. One or both ends of each heat exchange tube registers with a water wall tube and a water flow circuit is formed which includes the water wall tubes and the heat exchange tubes for passing the water in a heat exchange relation with the bed.

BRIEF DESCRIPTION OF THE DRAWINGS

The above brief description, as well as further objects, features and advantages of the present invention will be more fully appreciated by reference to the following detailed description of the presently preferred but nonetheless illustrative embodiment in accordance with the present invention when taken in conjunction with the accompanying drawings in which:

FIG. 1 is a vertical sectional view of a portion of a reactor according to the present invention;

FIGS. 2, 3 and 5 are views similar to FIG. 1, but depicting alternate embodiments of the reactor of the present invention; and FIGS. 4 and 6 are cross-sectional views taken along the lines 4—4 and 6—6 of FIGS. 3 and 5, respectively.

DESCRIPTION OF THE PREFERRED EMBODIMENT

Figure 6:
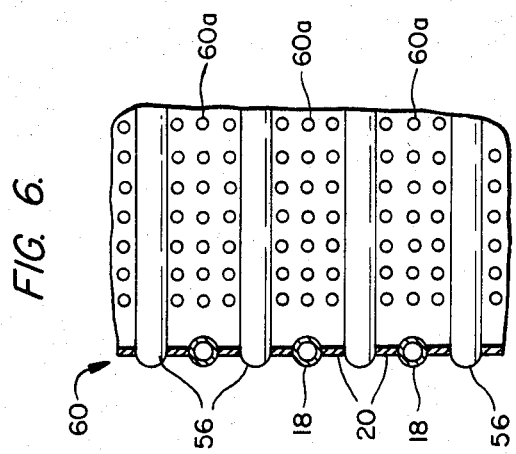

Referring to FIG. 1 of the drawings, the reference numeral 10 refers in general to an enclosure forming a major portion of a fluidized bed reactor which may be in the form of a boiler, a combustor, a steam generator or any similar type device. The enclosure 10 consists of a front wall 12, a rear wall 14, and two sidewalls, one of which is shown by the reference numeral 16. According to the exemplary embodiment shown, each wall is formed by a plurality of vertically-extending tubes 18 disposed in a spaced, parallel relationship and connected together by a plurality of elongated fins 20 extending for the entire lengths of the tubes and connected to diametrically opposed surfaces of the tubes in a conventional manner. The upper portion of the enclosure 10 is not shown for the convenience of presentation, it being understood that it consists of a convection section, a roof and an outlet for allowing the combustion gases to discharge, also in a conventional manner.

A bed of particulate material, shown in general by the reference numeral 22, is disposed within the enclosure 10 and rests on a perforated plate, or grate, 24 extending horizontally in the lower portion of the enclosure. The bed 22 can consist of a mixture of discrete particles of fuel material such as bituminous coal, and an adsorbent, such as limestone, for adsorbing the sulfur released by the combustion of the fuel material.

An air plenum 26 is provided immediately below the plate 24 and receives pressurized air from a source (not shown) via an air conduit 28. The air entering the plenum 26 passes through the perforations in the grate 24 and into the bed 22 for fluidizing the particulate material forming the bed and for supplying combustion-supporting oxygen to the bed. It is understood that a flow control damper or valve (not shown) can be provided in the conduit 28 to control the flow of air into the plenum 26 in a conventional manner.

Two overbed feeders 30 and 32 extend through a rear wall 14 and receive particulate adsorbent and coal, respectively, from inlet ducts or the like (not shown), and are adapted to feed the particles onto the upper surface of the bed 22. The feeders 30 and 32 operate by gravity discharge or can be in the form of spreader-type feeders or any other similar device. It is understood that additional feeders can also be provided through one or more of the other walls 12 and 16 as needed.

A drain pipe 36 extends through the wall 14 and has an inlet end portion that registers with the interior of the enclosure 10 in communication with the lower portion of the bed 22. The pipe 36 is thus adapted to receive the spent bed material as it migrates downwardly in the bed and functions to discharge the material from the enclosure 10 by gravity to a screw cooler, conveyor belt, or the like (not shown).

A pair of horizontal inlet headers 38 are connected in fluid communication with the tubes 18 forming the front wall 12 and the rear wall 14, respectively, and another pair of inlet headers, one of which is shown by the reference numeral 40, are connected in fluid communication with the tubes 18 forming the respective sidewalls 16. A pair of outlet headers 42 are connected in communication with the upper ends of the tubes 18 and a pair of outlet headers, one of which is shown by the reference numeral 43, are connected in communication with the upper ends of the sidewalls 16. As a result, a fluid to be heated can be sequentially or simultaneously passed through the walls 12, 14 and 16 to pick up the heat from the fluidized bed in a conventional manner before it is passed from the outlet headers to external apparatus for further processing.

A bundle of heat exchange tubes 44 are provided in the enclosure 10 with the lower end of each tube extending from a horizontal inlet header 46 disposed below the grate 24 in the plenum 26. Each tube passes through the bed in a substantially "V" configuration, with its upper end being welded in registry with a tube 18 forming the front wall 12 of the enclosure to join the circuits. Although only one tube 44 is shown in FIG. 1, it is understood that a bundle is formed by a series of tubes spaced in a plane perpendicular to the drawing, with each tube preferably being connected to a corresponding tube 18 of the water wall.

It is understood that the fluid flow circuit thus formed by the inlet headers 38, 40 and 46, the tubes 18 and 44, and the outlet headers 42 and 43 can be a portion of a "once-through" circuit in which a pump or the like (not shown) is provided for pumping the fluid through the various headers and tubes, and that downcomers or the like, can be provided as needed. Alternatively, the aforementioned fluid flow circuit can be a part of a natural circulation system in which a steam drum, or the like, would replace the aforementioned outlet headers and would be connected by piping or the like to the water wall tubes 18, and the heat exchange tubes 44 of the flow circuit.

In operation, air is distributed through the air conduit 28 into the plenum 26 and flows upwardly through the plate 24 and into the bed of particulate absorbent and fuel material to fluidize the latter and supply combustion-supporting oxygen to the bed. The air combines with the gaseous products of combustion from the bed and the mixture passes upwardly through the enclosure 10 before exiting through the upper portion of the enclosure. A light-off burner or the like (not shown) is then fired to heat the material in the bed until the temperature of the material reaches a predetermined level at which time the particulate absorbent and fuel is discharged from the feeders 30 and 32, respectively, and onto the upper surface of the bed 22 as needed to insure a continuous replenishing of the adsorbent and fuel material as it is consumed. The spent adsorbent and fuel material is discharged from the bed via the drain pipe 36.

Cooling fluid, preferably water, from a pump, a steam drum, or the like, is introduced into the headers 38 and 40 where it passes upwardly through the walls formed by the water wall tubes 18 to pick up heat from the fluidized bed. The water is also introduced to the header 46 and passes through the tubes 44 forming the tube bundle in the bed 22 to pick up additional heat and thus enable the bed to be operated within relative close temperature limits. The latter water is added to the water flowing upwardly through the tubes 18 forming the front wall 12 in the upper portion of the enclosure 10 by virtue of the registry of the tubes 44 with the corresponding tubes 18 in the front wall 12. The heated water is then passed out through the outlet headers 42 and 43 provided at the upper portions of the walls 12, 14 and 16 and to suitable piping for external processing, or back to the steam drum, depending on the particular design involved.

The point at which the tube 44 physically joins the tube 18 in the front wall 12 may be difficult to cool. In such a case refractory may be used to cover the tube junction to control heat absorption in this area.

The registering of the upper end of each of the tubes 44 with a corresponding tube 18 thus eliminates the need for a separate fluid flow circuit for the tubes 44, including headers, downcomers and the like, and thus minimizes costs and complexities in installation.

The embodiment of FIG. 2 is similar to that of FIG. 1 and identical components are referred to by the same reference numbers.

According to this embodiment, a bundle of tubes 50, each bent into a substantial "V" shaped configuration, are provided in the bed 22 with both ends of each tube 50 merging into the front wall 12 between two adjacent tubes 18 forming the front wall. More specifically, the lower end of each tube 50 is disposed between two adjacent tubes 18 in the lower portion of the bed 22 just above the plate 24 and the upper end of each tube 50 is disposed between two adjacent tubes 18 at a location proximate to the upper surface of the bed. The fins 20 are bent outwardly, as shown by the reference numeral 20a, at the point of merger of each tube 50 with its corresponding tubes 18. As in the previous embodiment, it is understood that additional tubes 50 are provided which are spaced in the plane of the drawing. The tubes 50 preferably are equal, or slightly less in number to the tubes 18 and extend in an alternating relationship with the latter tubes.

The operation of the embodiment of FIG. 2 is identical to that of FIG. 1 with the exception that the lower ends of the tubes 50 receive the water from the same inlet header 38 as the tubes 18 forming the front wall 12, and the upper ends of the tubes 50 discharge the heated water into the same outlet header 42, thus eliminating the need of a separate inlet and outlet headers.

According to the embodiment of FIGS. 3 and 4, a bundle of tubes 52 and a bundle of tubes 54 are provided which extend from the headers 38 in an alternating relationship with the tubes 18 of the front wall 12 and the rear wall 14, respectively. More particularly, each tube 52 is connected at its lower end to the header 38, extends outwardly at an angle externally of the enclosure 10, then horizontally across the enclosure 10 and then upwardly at an inclined angle across the bed 22, with its upper end merging into the front wall 12 between a pair of corresponding tubes 18, with the upper end portions of the tubes 52 and 18 thus extending in an alternating relationship. The tubes 54 extend in a similar fashion but in an opposite direction, with the upper outlet ends thereof merging into the rear wall 14.

A water-cooled panel, or plate 55 is formed by the horizontally extending portions of the tubes 52 and 54, and a plurality of plate sections 55 (FIG. 4) which extend between, and are connected to, adjacent tubes 52 and 54 as shown. The panel 55 supports the bed 22 and permits the introduction of air through the perforations in the plate sections 55a to fluidize the bed material.

As in the previous embodiment, a portion of the fins 20 extending between the adjacent tubes 18 in the walls 12 and 14 are bent outwardly, as shown by the reference numeral 20a, to accommodate the merging of the tubes 52 with the tubes 18 in the front wall 12 and the merging of the tubes 54 with the tubes 18 in the rear wall 14. Also, although only one tube 52 and one tube 54 is shown, it is understood that additional tubes in the respective bundles are provided in a plane perpendicular to the plane of the drawings preferably equal, or slightly less, in number to the tubes 18. It is noted that the inlet header associated with the sidewall 16 shown in FIG. 3 is not shown due to the fact it is spaced behind the tubes 52 and 54 in the plane of the drawing.

The operation of the embodiment of FIGS. 3 and 4 is similar to that of the previous embodiment, with the exception that water from the inlet headers 38 is immediately introduced to the tubes 18 in the walls 12 and 14 as well as the tubes 52 and 54 before passing through the upper portion of the enclosure 10 as discussed above.

Figure 5:
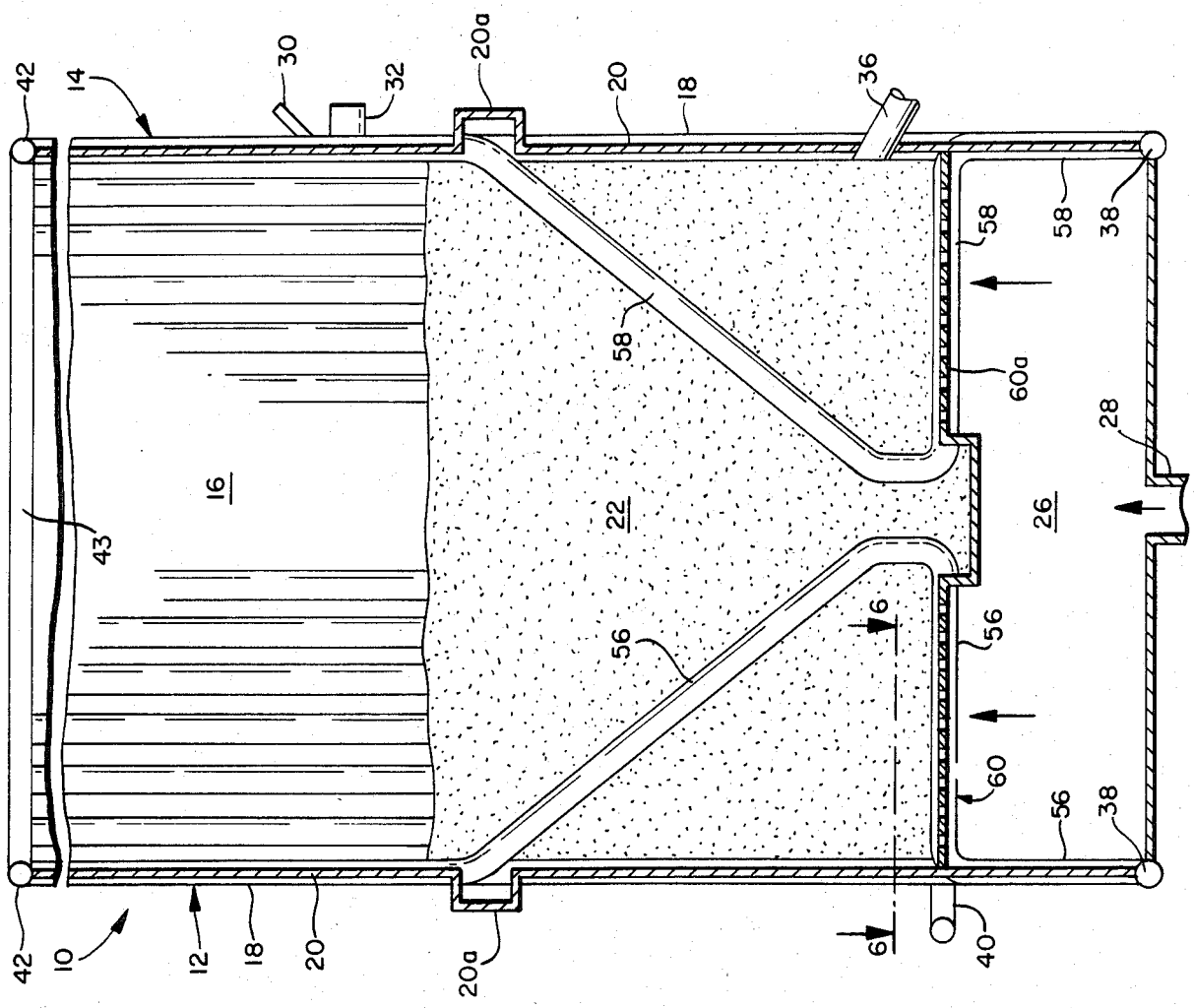

According to the embodiment of FIGS. 5 and 6, a first bundle of tubes 56 is provided which tubes are connected at their lower ends to the header 38, extend upwardly between adjacent pairs of tubes 18 forming the front wall 12, and horizontally across the enclosure 10 before extending upwardly at an angle through the bed 22 where their upper ends merge back into the front wall 12 between the corresponding pair of tubes 18. A second bundle of tubes 58 are also provided which extend in the same manner but in an opposite direction, with their upper ends merging into the rear wall 14 between corresponding pairs of tubes 18. As in the previous embodiment, a portion of the fins 20 extending between the adjacent tubes 18 in the front wall 12 and the rear wall 14 are bent outwardly, as shown by the reference numeral 20a, to accommodate the merging of the tubes 56 and the tubes 18 in the front wall and the merging of the tubes 58 and the tubes 18 in the rear wall 14. As shown in FIG. 6, a water-cooled panel, or plate, 60 is formed by a plurality of plate sections 60a extending between adjacent tubes 56 and adjacent tubes 58, for supporting the bed 22.

It is thus seen that as a result of the unique configuration of the present invention, the absorption surfaces in the fluidized bed are provided without the complexities and high costs normally associated with separate flow circuitry provided for the water wall tubes and for the heat exchange tube bundles. Also, the various heat exchange tube configurations in the fluidized bed can be installed in a simple and efficient manner at minimum costs.

It is understood that the variations in the foregoing can be made without departing from the scope of the invention. For example, the specific configuration of the tubes forming the tube bundles can be changed as long as the foregoing results are achieved. Also, fluidization nozzles, or the like, can be placed in the perforations in the plate or panel that support the bed of particulate material, to receive the air and direct same into the bed to fluidize same. Also, in the embodiments of FIGS. 2, 3-4 and 5-6, there is a wide spacing between adjacent tubes 18 in the portions of the walls 12 and 14 not containing the tubes 50, 52, 54, 56 and 58. In such a case, the fins 20 joining the tube 18 may tend to get hot and it would be preferred to increase the outside diameter of the tubes 18 in the bed area and/or to coat the fins with insulating refractory to control the temperature and wall heat absorption.

Other modifications, changes and substitutions are intended in the foregoing disclosure and in some instances some features of the invention will be employed without a corresponding use of other features. Accordingly, it is appropriate that the appended claims be construed broadly and in a manner consistent with the spirit and scope of the invention therein.

What is claimed is:

1. A fluidized bed reactor comprising a first series of tubes forming at least a portion of the walls of an enclosure; a bed of combustible particulate material disposed in said enclosure; a second series of tubes each of which has a first portion extending through said bed of particulate material, and a second portion extending between a pair of adjacent tubes of said first series; first and second header means connected to the upper and lower ends, respectively, of the tubes of said first and second series to form a water flow circuit including said first series of tubes and said second series of tubes for passing said water in a heat exchange relation with said bed of particulate material; and means for passing air through said bed of particulate material to fluidize and promote combustion of said material.

2. The reactor of claim 1 wherein each tube of said second series extends from second header means, through said bed of particulate material and to said first header means.

3. The reactor of claim 1 wherein each tube of said second series has a third portion extending horizontally across said bed of particulate material for receiving said material.

4. The reactor of claim 3 further comprises a plurality of grate sections extending between said third tube portions to provide a support for said bed of particulate material.

* * * * *